United States Patent
Sibley et al.

(10) Patent No.: US 7,584,493 B2
(45) Date of Patent: Sep. 1, 2009

(54) RECEIVER CARD TECHNOLOGY FOR A BROADCAST SUBSCRIPTION VIDEO SERVICE

(75) Inventors: Erin H. Sibley, Los Angeles, CA (US); Paul D. Tarbuck, Hawthorne, CA (US)

(73) Assignee: The Boeing Company, Chicago, IL (US)

( * ) Notice: Subject to any disclaimer, the term of this patent is extended or adjusted under 35 U.S.C. 154(b) by 1156 days.

(21) Appl. No.: 10/409,875

(22) Filed: Apr. 9, 2003

(65) Prior Publication Data

US 2003/0204845 A1    Oct. 30, 2003

Related U.S. Application Data

(60) Provisional application No. 60/376,084, filed on Apr. 29, 2002.

(51) Int. Cl.
  *H04N 7/20* (2006.01)
(52) U.S. Cl. .................. 725/68; 725/153; 725/25; 725/149; 380/211
(58) Field of Classification Search .................. 725/68
  See application file for complete search history.

(56) References Cited

U.S. PATENT DOCUMENTS

| | | | | |
|---|---|---|---|---|
| 5,655,214 A | * | 8/1997 | Mullett | 725/78 |
| 5,917,467 A | * | 6/1999 | Yoshimura | 345/581 |
| 5,940,776 A | * | 8/1999 | Baron et al. | 702/4 |
| 5,982,363 A | | 11/1999 | Naiff et al. | |
| 5,990,927 A | | 11/1999 | Hendricks et al. | |
| 6,040,851 A | * | 3/2000 | Cheng et al. | 725/132 |
| 6,219,537 B1 | | 4/2001 | James et al. | |
| 6,278,733 B1 | | 8/2001 | Bennett et al. | |
| 6,396,544 B1 | | 5/2002 | Schindler et al. | |
| 6,476,825 B1 | | 11/2002 | Croy et al. | |
| 6,556,251 B1 | | 4/2003 | Sorensen | |
| 6,901,606 B2 | | 5/2005 | Wright et al. | |

(Continued)

FOREIGN PATENT DOCUMENTS

EP    0 491 068    6/1992

(Continued)

OTHER PUBLICATIONS

Non-Final Office Action dated Sep. 10, 2007 in U.S. Appl. No. 10/700,089, filed Nov. 3, 2003 by Erin Hall Sibley.

(Continued)

*Primary Examiner*—Vivek Srivastava
*Assistant Examiner*—Jivka Rabovianski
(74) *Attorney, Agent, or Firm*—Gates & Cooper LLP (57) ABSTRACT

An integrated plug-in card is configured to process subscription video programming. The card consists of multiple integrated technologies. A micro analog tuner/demodulator receives the subscription video programming and provides output to a vertical blanking interval (VBI) device. The vertical blanking interface device separates an unused portion of the subscription video programming to extract an encoded proprietary programming. Conditional access/decryption technology controls user access to the encoded proprietary programming. Video and audio decompression technology decompresses video and audio data from the encoded proprietary programming. An encoder provides the video and audio data in a desired protocol. A control interface controls video programming properties and a memory is utilized for storing video programming information.

24 Claims, 9 Drawing Sheets

U.S. PATENT DOCUMENTS

| | | | |
|---|---|---|---|
| 7,020,839 B1 * | 3/2006 | Hosoda | 715/523 |
| 2001/0029610 A1 * | 10/2001 | Corvin et al. | 725/42 |
| 2001/0039180 A1 | 11/2001 | Sibley et al. | |
| 2001/0039662 A1 | 11/2001 | Sibley | |
| 2001/0039663 A1 | 11/2001 | Sibley | |
| 2001/0039664 A1 | 11/2001 | Sibley | |
| 2001/0053700 A1 | 12/2001 | Sibley | |
| 2002/0012347 A1 * | 1/2002 | Fitzpatrick | 370/392 |
| 2002/0016820 A1 * | 2/2002 | Du Val et al. | 709/203 |
| 2002/0018568 A1 | 2/2002 | Weaver, III et al. | |
| 2002/0019987 A1 | 2/2002 | James et al. | |
| 2002/0027562 A1 | 3/2002 | Kimble et al. | |
| 2002/0065678 A1 | 5/2002 | Peliotis et al. | |
| 2002/0080161 A1 | 6/2002 | St. Maurice et al. | |
| 2002/0129374 A1 | 9/2002 | Freeman et al. | |
| 2002/0145621 A1 | 10/2002 | Nguyen | |
| 2002/0196364 A1 | 12/2002 | Hendricks | |
| 2003/0023988 A1 * | 1/2003 | Lee et al. | 725/143 |
| 2003/0097657 A1 | 5/2003 | Zhou et al. | |
| 2003/0097662 A1 * | 5/2003 | Russ et al. | 725/117 |
| 2003/0171985 A1 * | 9/2003 | Prabhu et al. | 705/14 |
| 2003/0188320 A1 * | 10/2003 | Shing | 725/131 |
| 2004/0078824 A1 | 4/2004 | Krisbergh et al. | |
| 2004/0100588 A1 | 5/2004 | Hartson et al. | |
| 2004/0133919 A1 | 7/2004 | Incentis | |
| 2004/0139469 A1 | 7/2004 | Incentis | |
| 2004/0139474 A1 | 7/2004 | Carro | |
| 2005/0108762 A1 * | 5/2005 | Chao et al. | 725/81 |
| 2005/0229213 A1 | 10/2005 | Ellis et al. | |
| 2006/0137028 A1 * | 6/2006 | Evans et al. | 726/29 |
| 2007/0016847 A1 * | 1/2007 | Reichardt et al. | 715/500.1 |
| 2008/0016526 A1 * | 1/2008 | Asmussen | 725/34 |

FOREIGN PATENT DOCUMENTS

| | | |
|---|---|---|
| EP | 1 152 614 | 11/2001 |
| WO | WO 01/97525 | 12/2001 |
| WO | WO 02/065772 | 8/2002 |

OTHER PUBLICATIONS

Non-Final Office Action dated Nov. 19, 2007 in U.S. Appl. No. 10/700,089, filed Nov. 3, 2003 by Erin Hall Sibley.

Examiner's Interview Summary dated Feb. 22, 2008 in U.S. Appl. No. 10/700,089, filed Nov. 3, 2003 by Erin Hall Sibley.

Final Office Action dated May 14, 2008 in U.S. Appl. No. 10/700,089, filed Nov. 3, 2003 by Erin Hall Sibley.

Non-Final Office Action dated Sep. 16, 2008 in U.S. Appl. No. 10,700,089, filed Nov. 3, 2003 by Erin Hall Sibley.

Interview Summary and Amendment Under 37 C.F.R. 1.111 filed Feb. 19, 2008 in U.S. Appl. No. 10/700,089, filed Nov. 3, 2003 by Erin Hall Sibley.

Amendment Under 37 C.F.R. 1.114 filed Aug. 12, 2008 in U.S. Appl. No. 10/700,089, filed Nov. 3, 2003 by Erin Hall Sibley.

* cited by examiner

RECEIVER CARD TECHNOLOGY FOR A BROADCAST SUBSCRIPTION VIDEO SERVICE

CROSS-REFERENCE TO RELATED APPLICATIONS

This application claims the benefit under 35 U.S.C. Section 119(e) of the following co-pending and commonly-assigned U.S. provisional patent application, which is incorporated by reference herein:

Provisional Application Serial No. 60/376,084, filed Apr. 29, 2002, by Erin H. Sibley and Paul Damain Tarbuck, entitled "RECEIVER CARD TECHNOLOGY FOR A BROADCAST SUBSCRIPTION VIDEO SERVICE."

This application is related to the following co-pending U.S. utility patent application, which are incorporated by reference herein:

Utility application Ser. No. 09/844,919, filed Apr. 26, 2001, by Erin H. Sibley, entitled "COMMUNICATION SYSTEM WITH SECONDARY CHANNEL REBROADCASTING WITHIN A LOCAL AREA NETWORK".

Utility application Ser. No. 09/844,976, filed Apr. 26, 2001, by Erin H. Sibley, entitled "DIGITAL OVER-THE-AIR COMMUNICATION SYSTEM FOR USE WITH ANALOG TERRESTRIAL BROADCASTING SYSTEM".

Utility application Ser. No. 09/844,932, filed Apr. 26, 2001, by Erin H. Sibley, entitled "PORTABLE DEVICE FOR USE WITH DIGITAL OVER-THE-AIR COMMUNICATION SYSTEM FOR USE WITH TERRESTRIAL BROADCASTING SYSTEM";

Utility application Ser. No. 09/844,923, filed Apr. 26, 2001, by Erin H. Sibley, entitled "DIGITAL OVER-THE-AIR COMMUNICATION SYSTEM FOR USE WITH DIGITAL TERRESTRIAL BROADCASTING SYSTEM";

Utility application Ser. No. 09/844,920, filed Apr. 26, 2001, by Erin H. Sibley and Michael W. Sales, entitled "COMMUNICATION SYSTEM FOR REBROADCASTING ELECTRONIC CONTENT WITHIN LOCAL AREA NETWORK";

Utility application Ser. No. 09/564,082, filed May 3, 2000;

U.S. Provisional Patent Application Serial No. 60/249,153 (PD-200352) filed on Nov. 16, 2000, entitled "Mobile Multimedia Subscription Programming Delivery System";

U.S. Provisional Patent Application Serial No. 60/268,482 (PD-201027) filed on Feb. 12, 2001, entitled "Portable Handheld Devices to Receive Digital Over The Air Broadcasts";

U.S. Provisional Patent Application Serial No. 60/262,811 (PD201008) filed on Jan. 19, 2001, entitled "A New Method For Delivering In-Vehicle Entertainment Services";

U.S. Provisional Patent Application Serial No. 60/271,578 (201029) filed on Feb. 22, 2001, entitled "A New Method And System For Delivering Mobile Direct To Home Entertainment Services"; and U.S. Provisional Patent Application Serial No. 60/272,741 (PD-201030) filed on Mar. 1, 2001, entitled "A New Method And System For Delivering Entertainment To Portable Devices".

BACKGROUND OF THE INVENTION

1. Field of the Invention.

The present invention relates generally to broadcasting digital information, and in particular, to a method, apparatus, and article of manufacture for receiving broadcast digital information in wireless personal digital assistants (PDAs) or laptop computers.

2. Description of the Related Art.

Digital direct broadcast systems such as DIRECTV®. and DIRECPC™ broadcast via satellite, television programs and information or computer applications, respectively. DIRECTV® broadcasts television programming in a similar fashion to that of terrestrial television. DIRECPC™ subscribers place requests that are queued up and broadcast, to the subscriber's computer. DIRECPC™ services on-demand requests. DIRECTV® and DIRECPC™ incorporate encryption in addressing for applications such as on-demand requests. These systems provide access control where users make selection decisions in advance of the content being broadcast.

The systems described above are all satellite-based systems. That is, each of the systems delivers content directly from a network operations center to a satellite that broadcasts the information to the users. Further, certain cable and satellite video programming (e.g., CNN™ or ESPN™) are not available over terrestrial based systems. Such systems, however, use satellite and cable delivery of video broadcast to primarily fixed users. For example, a satellite-based system requires the placement of a satellite dish on the building in which the service is used. The satellite dishes must be positioned in a location on the building so that they are positioned toward the geostationary satellite generating the broadcast signals. If the "view" to the satellite is blocked by trees or other buildings, the service cannot be used. Also, some consumers view the satellite dishes as not aesthetically pleasing. Further, cable television is not available to wireless receivers.

Mobile devices such as cellular phones and personal digital assistants are increasing their presence in the marketplace. The functionality of such devices is increasing to such applications as the Internet. However, such devices have heretofore been limited to Internet applications.

Satellite connectivity to mobile devices is available in a wireless fashion. However, satellite television reception is not practical for wireless handheld devices due to the excessive cost, large size and complexity of antennas desired, and flexibility for tracking the satellite. Satellite radio is available to smaller wireless receivers. However, satellite radio does not include video programming. Therefore, it was previously assumed that no economical method for delivering video programming (e.g., cable-like channels) to mobile devices was practical. In this regard, the prior art fails to provide video programming via terrestrial over-the-air transmissions to the typical wireless TV users.

It would therefore be desirable to provide video programming to mobile devices in a reliable and cost effective manner.

SUMMARY OF THE INVENTION

On or more embodiments of the invention provide various PC-like plug-in cards that can slide into equipment such as a computer laptop or personal digital assistant (PDA) handheld device. The cards will enable reception of proprietary television signals for subscription programming to wireless users. Most PDAs and computer laptops provide PCMCIA and Flash card interfaces that can accommodate the cards described herein.

One type of card may interface with the PCMCIA and other types of interfaces while a second type of card may interface with the Flash card or similar type of interface.

Thus, embodiments of the invention provide for the integration of multiple technologies into a single card thereby allowing greater flexibility amongst different user equipment.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention allow subscription based video broadcasts to wireless handheld personal digital assistants (PDAs) or laptop computers when host equipment includes the technology described herein.

Detailed Description

In the following figures the same reference numerals will be used to identify the same components in the various views.

As described in this application, "electronic content" is meant to encompass various types of digital information including the distribution of video programming, music, videos, movies, music videos, games, advertising and promotional materials associated with the content. "Electronic content" may also include cable-type television programming that includes wide variety of multi-channel content.

Figure 1:
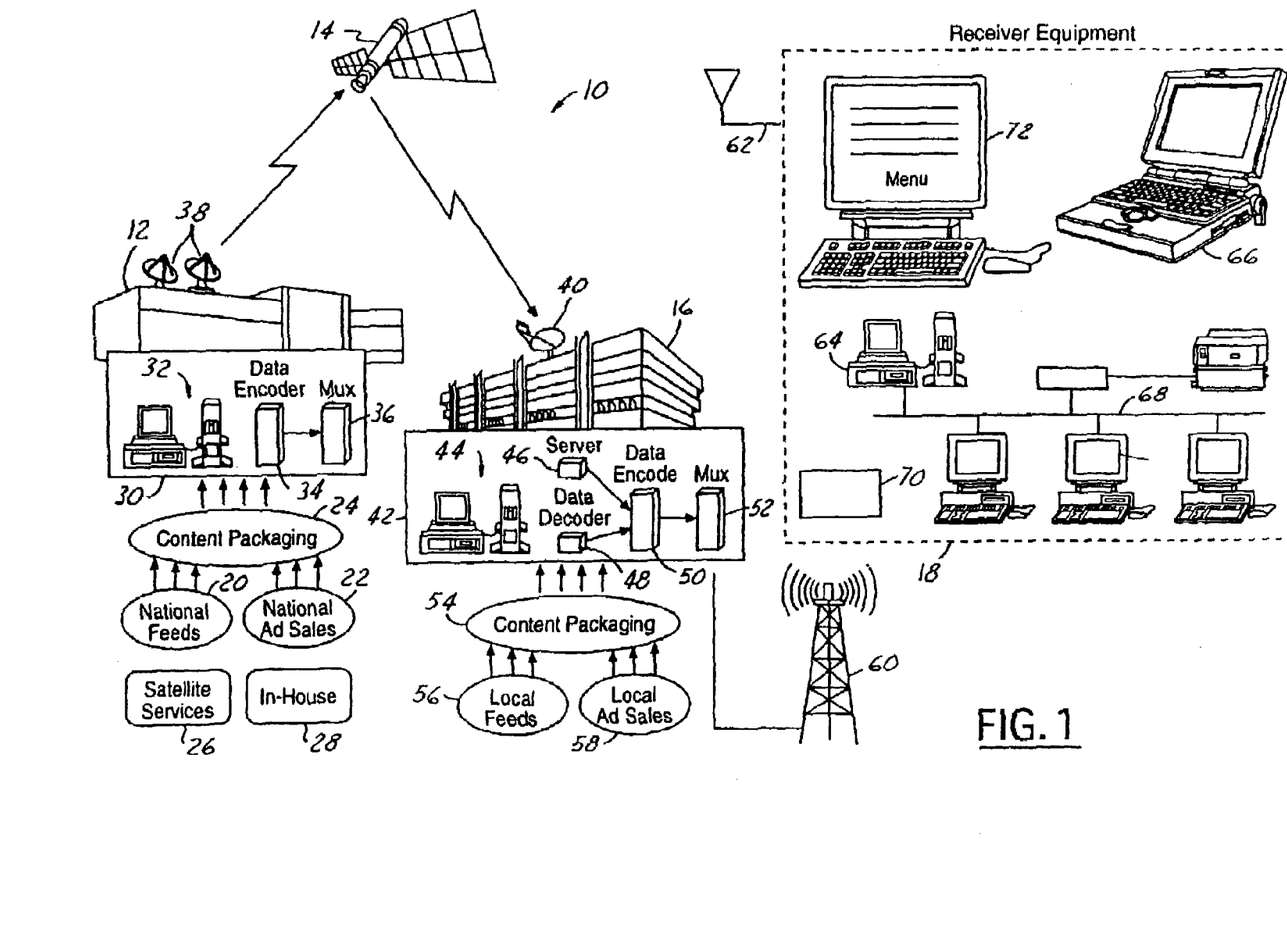
FIG. 1 is a diagrammatic view of the system architecture of a system in accordance with one or more embodiments of the invention.

Referring now to FIG. 1, electronic content distribution system 10 is illustrated. Electronic distribution system 10 generally has a network operations center (NOC) 12, a satellite 14 in communication with NOC 12, an over-the-air broadcast center 16 that is coupled to users 18 over the air. The network operations center 12 is coupled to national feeds 20 and national ad sales 22 through content packaging 24. National feeds 20 may, for example, be national "cable" type services channels or satellite service such as DIRECPC™ or DIRECTV®. The national ad sales 22 may be derived in-house 28 or as will be further described below may be obtained from various promotional ad agencies. A content packaging block 24 is coupled to national feeds 20 and national ad sales 22. The content packaging 24 functions to couple national feeds 20 with national ad sales 22.

The network operations center 12 has a control system that includes various computers 32, a data encoder 34, and a multiplexer 36 that are coupled to antennas 38 that uplink electronic content to satellite 14. The control system 30 operates in a manner known to those skilled in the art.

Over-the-air broadcast center 16 has an antenna 40 that receives downlink signals from satellite 14. Over-the-air broadcast center 16 has a control system 42 that comprises a control computer 44, a server 46, a data decoder 48, a data encoder 50, and a multiplexer 52. Control system 42 is coupled to content packaging 54, which in turn is coupled to local feeds 56 and local ad sales 58. The over-the-air broadcast center receives downlink signals from satellite 14. Control system 42 may also receive local channel feeds through local feeds 56 and may also provide local advertising content through local ad sales 58. The local feeds 56, local ad sales 58, and downlink signals from satellite 14 are combined in control system 42. Some of the information from satellite 14 may also be stored in server 46 for on-demand broadcasting.

Control system 42 is coupled to a wireless transmitter 60 that broadcasts the wireless signals to users 18. Wireless transmitter 60 may comprise a cell tower such as that used in cellular phones, a TV tower that broadcasts digital signals or a stratospheric platform positioned above a predetermined metropolitan area for broadcasting over-the-air signals. If the wireless transmitter 60 comprises a TV tower, the channels broadcast may be excess channels or bandwidth for a metropolitan area allocated in HDTV format. As will be further described below, to allow quick deployment of a system, an HDTV format may not be relied upon. That is, the digital over-the-air content may be incorporated into unused portions of an analog television broadcast, i.e., the vertical blanking interval.

Users 18 are coupled to an antenna 62 used for receiving over-the-air broadcast signals. Users 18 may comprise a variety of devices such as a personal computer 64, a laptop computer 66, a network 68 or a hand-held device 70. Each of the devices is preferably coupled to an antenna 62 for receiving over-the-air signals. Each device may have the antenna 62 coupled therein or may be connected to a separate antenna such as that of an automotive vehicle. Hand-held device 70 may comprise a variety of devices such as a digital media receiver, a personal digital assistant, or other type of handheld device. Preferably, each device associated with user 18 has a menu 72 or other selection apparatus such as buttons or switches for selecting electronic content broadcast by over-the-air broadcast center 16. Menu 72 may provide information to the user as to the current electronic content being broadcast or may provide an interface to the electronic content stored within the user device.

In operation, the network operations center 12 provides a substantial amount of the content to be broadcast by the over-the-air broadcast center 16. In an actual implementation, very few network operations centers are required. Preferably, only one network operations center 12 is provided. A substantial amount of programming is uplinked to satellite 14. Satellite 14 downlinks various electronic content to over-the-air broadcast centers 16 throughout the country. The over-the-air broadcast center 16 may also combine local content and local ads through local feeds 56 and local ad sales 58. Users 18 may also be coupled to broadcast center 16. Thus, if on-demand service is desired, broadcast center 16 through telephone wires or through a wireless medium may be contacted so that the broadcast center 16 broadcasts the information through wireless transmitter 60. As will be further described below, broadcast center 16 may track data so that affinity information may be broadcast with the electronic content so that the users may filter the electronic content and store the electronic content on the user devices.

Figure 2:
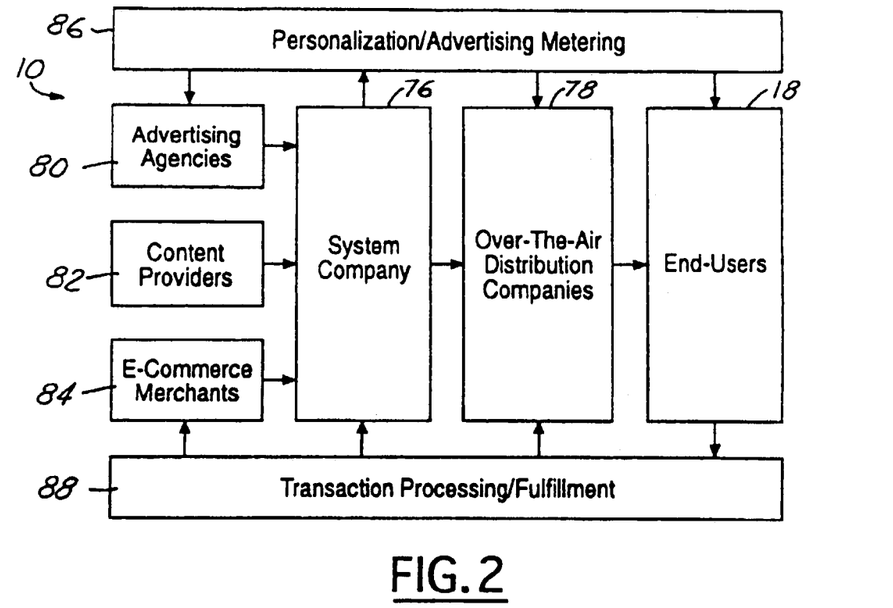
FIG. 2 is a block diagrammatic view of the business interactions in accordance with one or more embodiments of the invention.

Referring now to FIG. 2, a business level view of an electronic content distribution system 10 is illustrated according to the present invention. The electronic content distribution system 10 is centered around a system company 76. The system company 76 is responsible for the initial broadcast and uplinking of the electronic content. The system company 76 interfaces with over-the-air distribution companies 78. The over-the-air distribution companies 78 may be cellular phone systems, television stations, or may be a company owned system. The over-the-air distribution companies are generally coupled to the end users 18 through the over-the-air broadcast.

System company 76 may also be coupled to various outside sources such as advertising agency 80, content providers 82, and e-commerce merchants 84. The personalization/advertising metering box 86 may represent various aspects of system company, over-the-air distribution and advertising agencies 80. Although illustrated separately, box 86 may be incorporated into these other functions. Personalization/advertising metering box 86 monitors the transactions by users 18 and helps to formulate an affinity model that is used to provide affinity information along with the electronic content to end users 18 so that material likely to be desirable to the particular end users 18 may be stored at the end users 18. The end users 18 are also coupled to transaction processing/fulfillment box 88. The transaction processing/fulfillment box 88 is shown coupled to system company 76, over-the-air distribution company 78, and c-commerce merchants 84. Although illustrated as a separate box, transaction processing/fulfillment box 88 may be incorporated into system company 76, over-the-air distribution company 78, and e-commerce merchants 84.

It is envisioned that end users 18 may subscribe to a predetermined service such as a television programming package as well as being able to request certain electronic content on demand. This may be done through the menu system as described above. Upon selecting a desired electronic content from the menu, the user device may be coupled to transaction processing/fulfillment box 88 wherein the on-demand service is paid for and wherein the over-the-air distribution system 78 broadcasts the information to the end user 18. The over-the-air distribution system may also be used to provide a decryption key to end users 18 for information stored on the user devices but is encrypted.

Advertising agencies 80 may provide targeted advertising that is coupled to various specific content of content providers 82 to particularly target a specific market.

Figure 3:
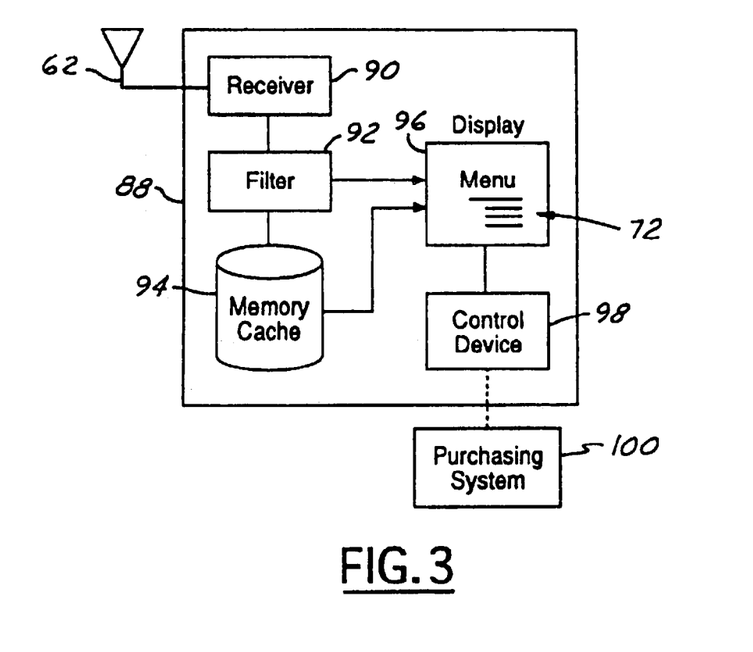
FIG. 3 is a block diagrammatic view of a user device for use in accordance with one or more embodiments of the invention.

Referring now to FIG. 3, one embodiment of a user device 88 is illustrated. Each user device 88 preferably is coupled to an antenna 62 as described above. Antenna 62 is coupled to a receiver 90 that receives the over-the-air signals and converts them into a useful format. Receiver 90 is coupled to a filter 92 that has affinity information of the user therein. Filter 92 is coupled to a memory cache 94. Memory cache 94 and filter 92 are coupled to a display 96 that is used to display menu 72. A control device 98 is coupled to display 96 to allow selections of various menu items from memory cache 94. Control 98 may also be used to select streaming content information being received at receiver 93 through filter 92. Control 98 may, for example, be a touch pad, keyboard, touch screen or other device. Control device 98 may also be coupled to the purchasing system 100 such as transaction processing/fulfillment box 88 of FIG. 2 above.

One advantage of the invention is that user device 88 may be mobile or fixed. That is, home users as well as mobile users such as those using hand-held devices or those with laptop computers may benefit from the system. In operation, the over-the-air broadcast center 16 broadcasts a variety of information simultaneously. Receiver 90 receives all the information and through the use of filter 92 decides whether or not to store the information in memory cache 94. The electronic content may be full rights to the electronic content, may be an encrypted from of the electronic content, or may be an indicator for menu 72 that will allow the user to make an on-demand request for the information. Filter 92 has affinity information associated therewith so that the electronic content received by receiver 90 may be screened.

In the simplest form, the broadcast content may be cable TV channels packaged as a service much like the service DirecTV® provides to households. In another embodiment, the broadcast electronic content may contain affinity information so that the filter 92 may compare the broadcast affinity information with the affinity information within the filter and thereby store only the potentially desirable electronic content in memory cache 94. For each item stored in memory cache 94, a menu item is displayed on display 96 so that the user may select the electronic content when desired.

If full rights are not given in the electronic content, the control device 98 may select purchasing the device from purchasing system 100. Thus, the receiver 90 may receive the on-demand information and/or a decryption key. The user device through menu 72 and display 96 may be also used to select various over-the-air streaming information from over-the-air broadcast center 16.

After purchasing the electronic content, the information may be provided to advertisers and to the network operations center 12 so that affinity information may be associated with the broadcast information. Data mining techniques may be also used at the network operations center 12 so that various affinity models may be generated to target specific audiences and markets. This information will form an affinity preference model for developing affinity preference models for content downloads. These affinity models may be periodically updated and as well, the filter terms located at the user device may also be updated.

Figure 4:
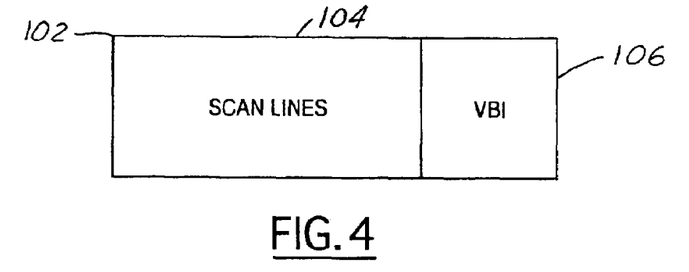
FIG. 4 is a representation of an analog signal having a vertical blanking interval in accordance with one or mote embodiments of the invention.

Referring now to FIG. 4, as mentioned above, over-the-air broadcast center 16 may be used for broadcasting the digital electronic content signals for use with an analog television signal 102. Such a system may be used for simply broadcasting cable-like television channels to portable devices or may include the other functions noted above. The analog television signal 102 is a conventional analog signal having a scan line portion or primary channel 104 corresponding to a number of scan lines. The scan lines correspond to the information used to form the image on the television screen. After the scan line portion 104, a vertical-blanking interval 106 is commonly broadcast. The vertical blanking interval 106 is essentially a pause before the next television signal with another set of scan lines and vertical blanking interval 106 is broadcast. The vertical blanking interval used in current analog systems typically employ about 24 scan lines. As mentioned above, the television signal 102 is an analog signal. Although an over-the-air analog signal has been described, the present invention may also be used in the vertical blanking interval of a digital satellite broadcast signal which will be described further in FIG. 12.

The present embodiment seeks to include electronic content in digital format during the vertical blanking interval 106. The digital signal is therefore superimposed upon the analog television signal 102. The electronic content during this time may also be referred to as a secondary channel.

Figure 5:
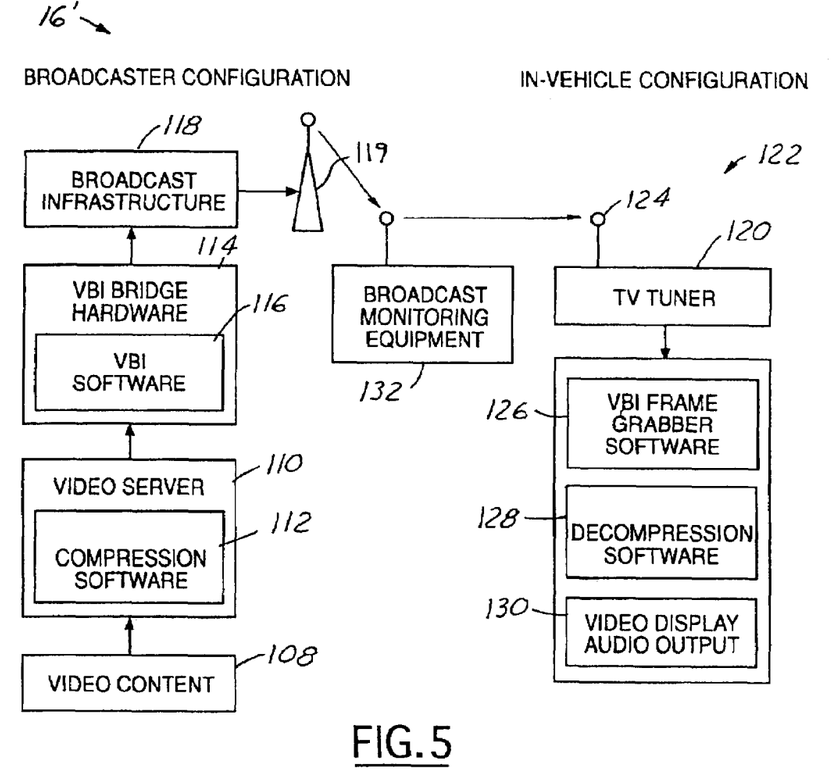
FIG. 5 is a high level block diagrammatic view of a broadcast system for a vertical blanking interval in accordance with one or more embodiments of the invention.

Referring now to FIG. 5, a second embodiment of an over-the-air broadcast center 16' is illustrated. In this embodiment, video content, whether local or through a satellite such as the one illustrated in FIG. 1, is provided to over-the-air broadcast center 16'. Video content 108 is provided to a video server 110 that has video compression software 112 therein. Any video compression may be utilized. For example, a suitable video compression may use MPEG 4 compression software 112. Such software is known to those skilled in the art. The digital video content 108 is then compressed by software 112 and provided to vertical blanking interval bridge hardware 114. Vertical blanking interval bridge hardware 114 may include vertical blanking interval software 116 which is used to superimpose the compressed digital signal onto the vertical blanking interval of the broadcast television signal. The combined signal is coupled to broadcast infrastructure 118 where the combined signal is then transmitted over the air with a broadcast antenna 119. Broadcast infrastructure 118 and antenna 119 may have components of the type described above in FIG. 1. Using such a standard high-speed vertical blanking interval combined with advanced compression (e.g., MPEG 4) techniques, the present invention may exceed any required capacity (e.g., of approximately 100 kbps).

A mobile device 122 capable of receiving the over-the-air broadcasts from broadcast antenna 119 is illustrated. Mobile device 122 may be one of the numerous devices described above in connection with FIG. 3. Exemplary devices include a personal digital assistant or a cellular phone. The present invention includes circuitry to receive the electronic content in addition to the functions of the device. For example, a personal digital assistant may still have calendaring and contact information as well as providing a display screen for displaying the received digital broadcast signal. A cellular phone, for example, may also include the capability of receiving telephone signals as well.

To carry through with the vertical blanking interval electronic content broadcast by broadcast infrastructure 118, an antenna 124 may be used to receive the entire broadcast television signal from antenna 119. This entire television signal includes both the regular broadcast channel as well as the digital electronic content embedded within the vertical blanking interval. A TV tuner 120 is incorporated into the mobile device 122 so that selections of different programming may be accomplished. Vertical blanking interval frame grabbing software 126 is used to receive a compressed digital video signal transmitted within the vertical blanking interval of the broadcast signal. The frame grabbing software 126 is coupled to decompression software 128 to decompress the compressed video signal. The decompressed video signal from decompression software 128 is displayed on an output device 130. Decompression software 128 may also include conditional access software. Conditional access software allows for only authorized viewing of the digital content on a memory. Such conditional access may be software coded into the device or provided on a separate card in a manner similar to that of the DIRECTV® system. Speakers may also be incorporated into output device 130 to provide audio simultaneously with the video.

Advantageously, the present invention allows over-the-air broadcast signals to act as a carrier for the digital electronic content desired to be provided to mobile users. While the emphasis is on mobile users, stationary users may also be serviced by such a system.

Monitoring equipment 132 may also be incorporated into the system. The monitoring equipment 132 provides feedback to the broadcast center corresponding to the quality of the signals so that adjustments may be made.

Figure 6:
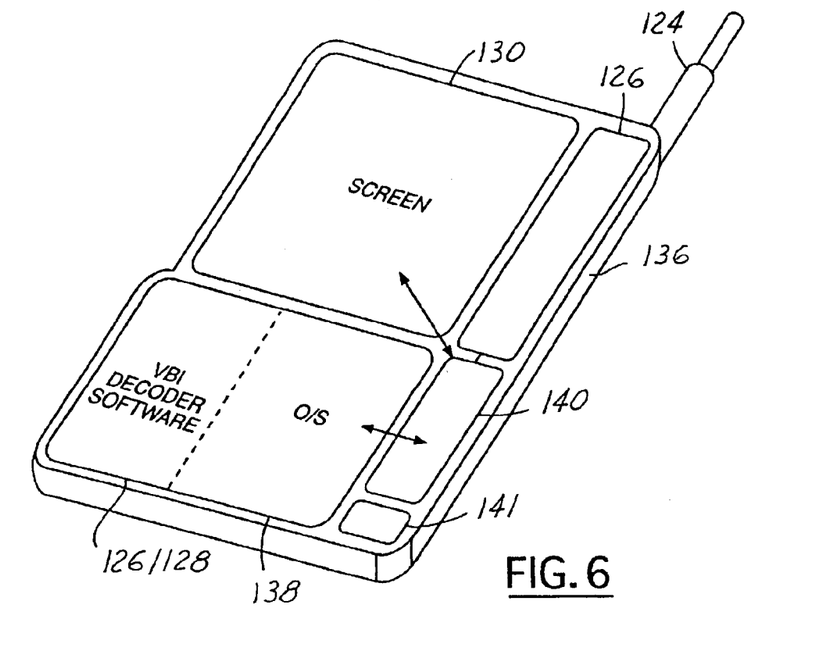
FIG. 6 is a block diagrammatic view of a personal digital assistant having vertical blanking interval reception in accordance with one or more embodiments of the invention.

Referring now to FIG. 6, a personal digital assistant 136 having the features according to the present invention are illustrated in a block diagrammatic form. The same reference numerals are used to illustrate the same components from FIG. 5. Personal digital assistant 136 has an operating system 138, which may be separate from the present invention. However, those skilled in the art will recognize that operating system 138 may include vertical blanking interval frame grabber software 126 and decompression and conditional access software 128 as a part thereof, as illustrated. Operating system 138 is coupled to various architectural elements 140 depending on the type of system. Architecture elements 140 are coupled to antenna 124 and to TV tuner 126. TV tuner 126, as above, allows the user to select the desired electronic content to be viewed on display 130. TV tuner 126 is thus coupled between architecture elements 140 and display 130. Architecture elements 140 may, for example, include an input device such as knobs, buttons, or switches for allowing the selection of various electronic content.

A power source 141 may also be included on the device. Power source 141 may be a battery or a rechargeable battery. This allows personal digital assistant 136 to be mobile. In addition to batteries, personal digital assistant 136 may also be powered with an AC adapter.

Figure 7:
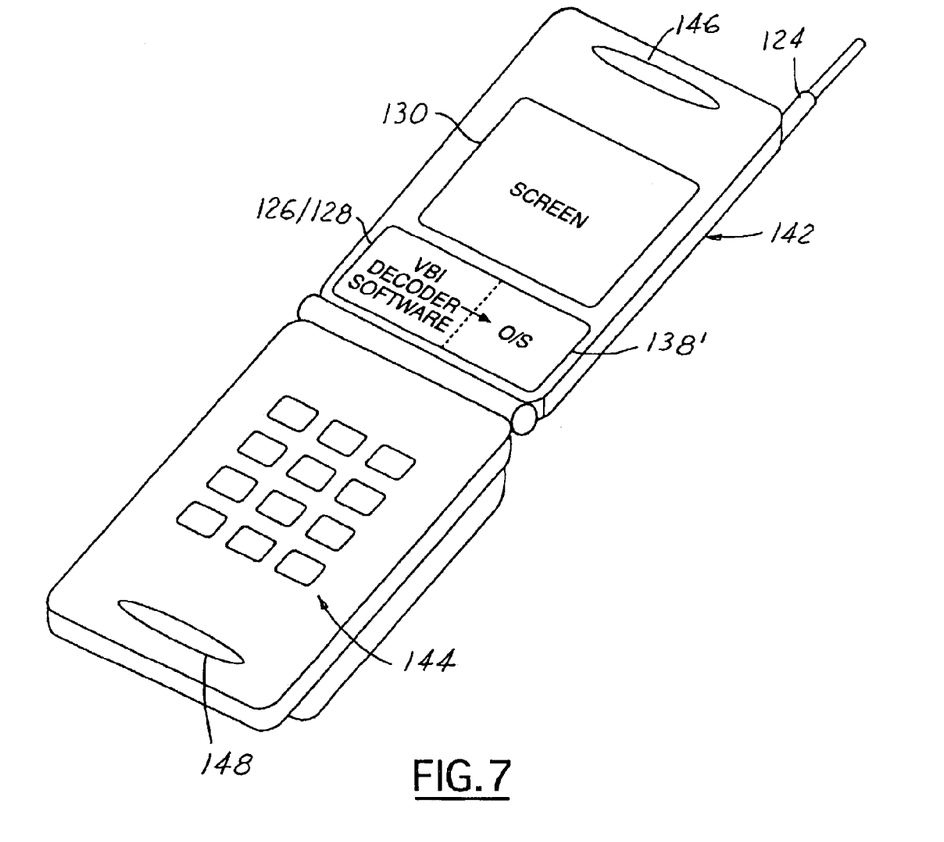
FIG. 7 is a block diagrammatic view of a cellular phone having a vertical blanking interval reception in accordance with one or more embodiments of the invention.

Referring now to FIG. 7, a cellular phone 142 is illustrated having the broadcast reception capability described above. In this embodiment, cellular phone 142 has an operating system 138' that supports the traditional cellular phone elements as well as those described above with respect to FIG. 6. Cellular phone 142 may also include a touch pad 144, an ear speaker 146, and a microphone 148 to support the cellular phone application.

Figure 8:
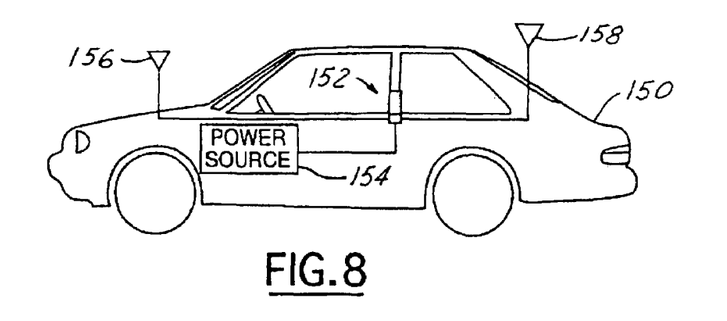
FIG. 8 is a block diagrammatic view of an automotive vehicle having a mobile device in accordance with one or more embodiments of the invention.

Referring now to FIG. 8, the present invention may be suited for mobile use such as in an automotive vehicle 150. Automotive vehicle 150 may incorporate a mobile device 152 therein. Mobile device 152 may be coupled to a vehicle power source 154 such as the vehicle battery. Also, mobile device 152 is preferably coupled to a first vehicle antenna 156 and preferably to a second vehicle antenna 158.

Figure 9:
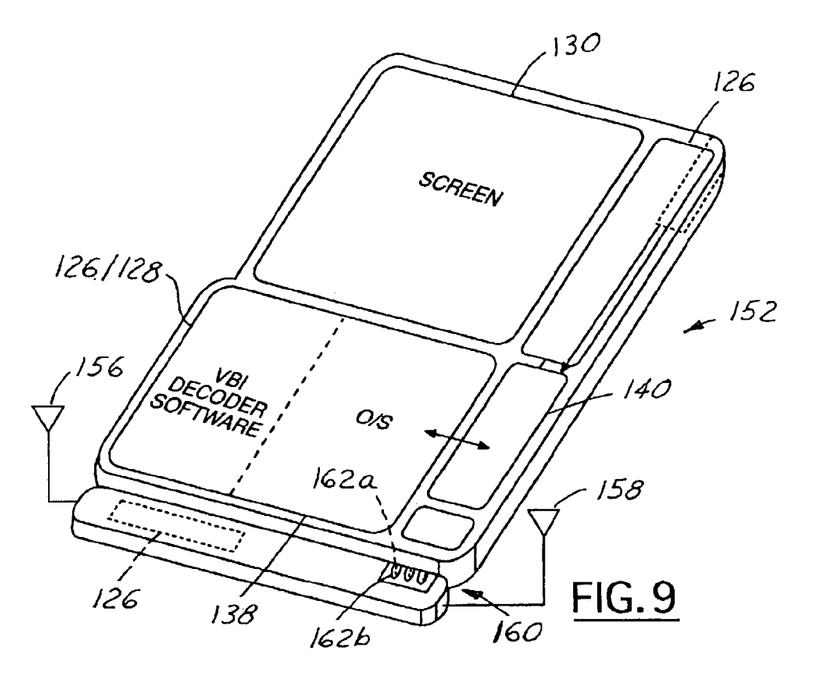
FIG. 9 is a more detailed block diagrammatic view of a mobile device according to FIG. 8.

Referring now also to FIG. 9, the same reference numerals are used to identify the same components from that of FIG. 6. Mobile device 152 may be coupled in a cradle 160. Cradle 160 may be coupled to vehicle power source 154 and to antennas 156 and 158. A connector 162 having a male portion 162A and a female portion 162B may be respectively coupled on mobile device 152 and connector 162. As illustrated, mobile device 152 is removable from cradle 160. However, in some automotive applications, mobile device 152 may be coupled fixedly to cradle 160. Cradle 160 may also have other electrical circuitry therein used for operating mobile device 152. As illustrated in dashed lines, TV tuner 126 may also be incorporated into cradle 160. Such a device would be suitable for a removable portable digital assistant wherein only the television tuner aspects are desired when mounted within cradle 160.

Figure 10:
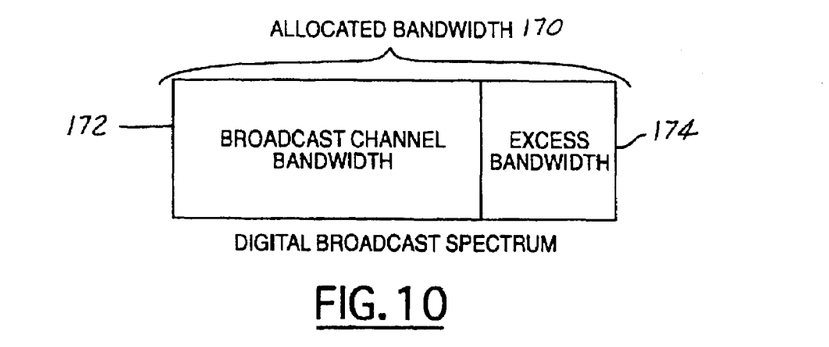
FIG. 10 is a representation of an allocated bandwidth for high definition television in accordance with one or more embodiments of the invention.

Referring now to FIG. 10, the present invention may also be suitable for use in an HDTV broadcasting environment. Governmental bodies have regulated the HDTV environment by providing an allocated bandwidth 170. The allocated bandwidth for a channel in the United States is 6 MHz. The allocated bandwidth 170 is less than the broadcast channel bandwidth 172 over which the television stations will broadcast the television signal. Thus, excess bandwidth 174 remains.

Figure 11:
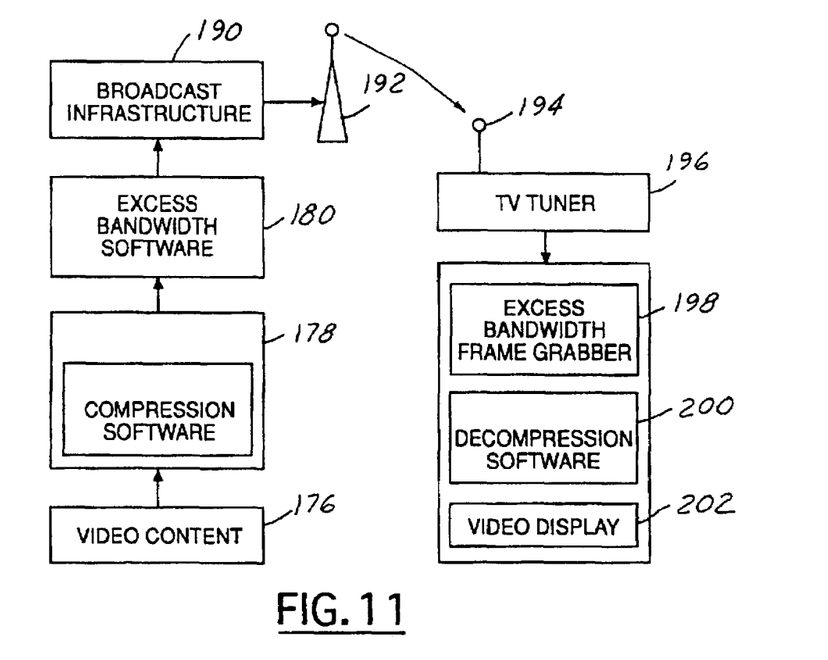
FIG. 11 is a block diagrammatic view of a broadcast and reception system in accordance with one or more embodiments of the invention for use with a high definition television system.

Referring now also to FIG. 11, a similar figure to that of FIG. 5 except rather than broadcasting over the vertical blanking interval, the excess bandwidth of the allocated bandwidth for a digital television signal is utilized to broadcast the digital signal. In this embodiment, video content 176 is provided to compression software 178. Excess bandwidth software is used to couple the regularly broadcast signal with the electronic content. Both signals are broadcast through broadcast infrastructure 190 through antenna 192. A receiving antenna 194 coupled to TV tuner 196 is used to receive the electronic content signal. An excess bandwidth frame grabber 198 grabs the electronic content from the excess bandwidth and provides it to decompressor 200. The decompressed video content is displayed on display 202 in a similar manner to that described above. Decompressor 200 may also include conditional access software as described above.

In operation, the system operator uplinks a plurality of electronic content packages to a satellite. These electronic content packages are preferably a subscriber type package such as that provided by DIRECTV® service. Preferably, at least a portion of the electronic content packages is common throughout the region or country. The electronic content packages are received from the satellite by the various over-the-air broadcasters. The over-the-air broadcasting broadcasts their regular signals and in addition, the digital electronic content. In the case of an analog television channel, the digital signal is superimposed over the vertical blanking interval of the signal. In the case of an HDTV signal, the digital content is provided in the excess bandwidth. The electronic content packages are received in a user appliance or device where either the analog signal or the HDTV signal is preferably disregarded except for the electronic content packages. Purchasers of the service are granted access by purchasing the conditional access software either directly (e.g. in a format card) or indirectly (e.g. purchasing an enabled device). Thus, the electronic content packages are granted access to, decompressed and displayed on the display device and any audio signals are heard through any speaker device incorporated within the user device.

Figure 12:
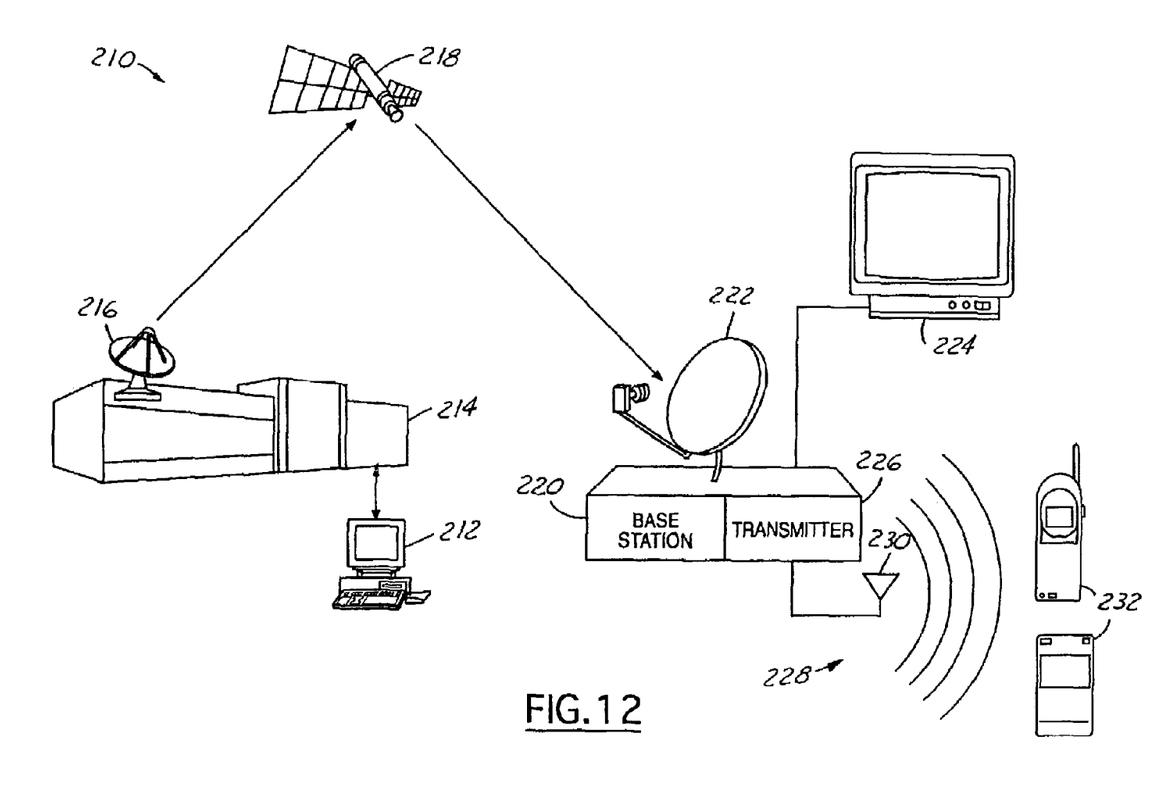
FIG. 12 is an alternative block diagrammatic view of a system in accordance with one or more embodiments of the invention.

Referring now to FIG. 12, another embodiment of the present invention is illustrated. The present invention may also be embodied in various types of content delivery systems such as a direct broadcast satellite system 210. In addition, a cable network or fiber optic network may also be used. The following description is directed to a direct broadcast satellite content delivery system. That is, a satellite may be used to broadcast both a primary channel and a secondary channel during the vertical blanking interval of the primary channel as mentioned above. System 210 has feeds 212, which are a simplified version of those shown above in FIG. 1. Feeds 212 are meant to be inclusive of various types of feeds including local feeds and cable-type broadcast feeds. The feeds 212 are coupled together at broadcast center 214. The broadcast center 214 organizes the signal and directs the television signals through an antenna 216 to a satellite 218. The broadcast center thus organizes the signals into primary channels, which contain a substantially greater amount of digital information than the secondary or vertical blanking interval channel broadcast during the vertical-blanking interval of the primary channel.

Satellite 218 broadcasts the primary channel and the vertical blanking interval secondary channel to a particular service area. In a cable or fiber optic system the primary and secondary channels are delivered via a cable or fiber optic cable rather than satellite 218.

A base station 220 having a receiving antenna 222 is illustrated receiving both the primary channel and the secondary vertical broadcast interval channel. Base station 220 represents a variety of potential types of base stations. Base station 220 may, for example, be similar to that of a set top box for the DIRECTV® systems. Base station 220 is coupled to a television 224 in a conventional manner. Preferably, television 224 receives the primary channel from base station 220. In a cable or fiber optic system, base station 220 may be connected to the cable or fiber optic cable directly.

Base station 220 may also include a transmitter 226 which is used to form a local area wireless network 228 between a transmitting antenna 230 and user devices 232. Preferably, the secondary or vertical blanking interval channel is transmitted to the user devices 232 in a wireless manner. Transmission may take place using standard formats such as the Bluetooth format for wireless devices. The user devices 232 include similar types of devices illustrated in FIGS. 6 and 7 such as cellular phones and personal digital assistants. Of course, those skilled in the art will recognize that various types of wireless devices configured to receive the frequencies broadcast by transmitter 226 may be employed.

Various uses for such a system will be evident to those skilled in the art. One use envisioned for such a device is for residential use so that both the primary channel may be enjoyed by watching television 224 while users throughout the house and nearby surroundings may enjoy the secondary channel broadcast during the vertical-blanking interval of the primary channel. Other uses include public buildings and public transportation. A base station may be employed on the building or public transportation to receive at minimum the secondary channel within the vertical blanking interval and rebroadcast the secondary channel to the mobile wireless devices. Examples of suitable public places include airports, shopping malls, arenas, subways, trains, buses and the like.

Figure 13:
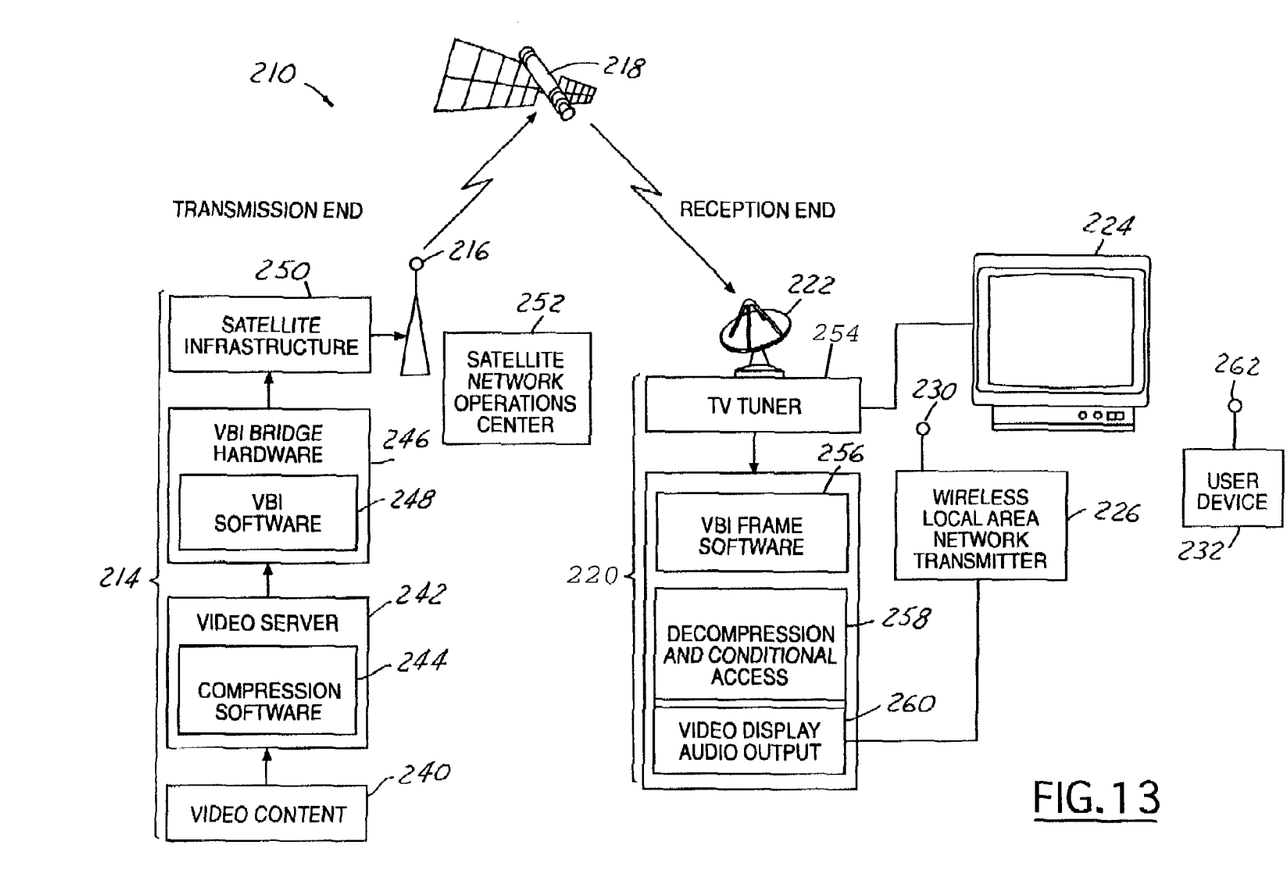
FIG. 13 is a more detailed block diagrammatic view of a system in accordance with one or more embodiments of the invention.

Referring now to FIG. 13, a more detailed block diagram of a broadcast system 210 is illustrated. FIG. 13 uses the same reference numerals for the same components as FIG. 12. Broadcast center 214 has similar content to FIG. 5. That is, video content 240 is provided to a video server 242 that has video compression software 244 therein. Similar video compression may be used as mentioned above with respect to software 112. The digital video content to be placed within the vertical blanking interval of the satellite broadcast signal is provided to vertical blanking interval bridge hardware 246 having vertical blanking interval software 248 therein. Vertical blanking interval software 248 is used to superimpose the compressed digital electronic content signal into the vertical blanking interval of the digital broadcast television signal.

Vertical blanking interval bridge hardware 246 is coupled to satellite infrastructure 250 rather than broadcast infrastructure 118 as illustrated in FIG. 5. Thus, the vertical blanking interval of the digital broadcast satellite signal is transmitted from satellite infrastructure 250 through antenna 216 to digital broadcast satellite 218.

A satellite network operation center 252 may be employed to control the movement and quality of the signals broadcast from the satellite 218. Broadcast center 214 in addition to the structure illustrated in FIG. 13 broadcasts the digital broadcast signal in a conventional manner with the addition of the secondary or vertical broadcast interval channel therein.

Base station 220 includes antenna 222 for receiving the digital satellite broadcast signals described above. A tuner 254 may also be included therein for tuning various channels received through the digital broadcast signal. TV tuner 254 may include various numbers of individual tuners for the use of multiple users. The multiple users may include directly connected users such as a television 224 or mobile user devices 232. TV tuner 254 may also be configured to receive both primary and secondary broadcast channels. At minimum, TV tuner 254 is configured to receive secondary digital broadcast signals.

TV tuner 254 is coupled to vertical blanking interval frame software 256 which is used to receive the compressed digital video signal transmitted within the vertical blanking interval of the digital broadcast signal. Vertical blanking interval frame software 256 is coupled to decompression and conditional access software 258. As mentioned above, the present system is preferably a subscription type service, which will be restricted through conditional access as described above. The electronic content forming the secondary channel is thus decompressed and allowed access to through decompression and conditional access software 258.

Video display and audio output 260 thus receives the electronic content forming the secondary channel which is then coupled to a wireless local area network transmitter 226. Wireless local area network transmitter 226 uses an antenna 230 to locally distribute the video display and audio output 260 to the user devices 232 using antenna 230 on the wireless local area network transmitter 226 and antenna 262 on user device 232. As mentioned above, wireless local area network preferably transmits the secondary channel using standard wireless technology such as Bluetooth or the 802.11 type interface. Preferably, the secondary channel has less digital video content that is suitable for retransmission to mobile devices. Typically, mobile devices do not include the processing power of high level devices such as set top boxes. Because mobile devices are smaller, the amount of content and thus the corresponding digital bits can be a lot smaller without losing the effect. This embodiment may also include another type of a high altitude communication device such as a stratospheric platform rather than a satellite. However, it is envisioned that a satellite will be more useful and reach more users than a stratospheric platform.

In operation, a primary channel having digital electronic content such as a secondary channel during a vertical blanking interval of the primary channel is uplinked to the high altitude communication device such as a satellite. The primary channel having the digital electronic content is received and over-the-air broadcast to the user devices where it is received, displayed, or heard. Preferably, a base station such as a set top box for the DIRECTV® system is modified to include the wireless local area network system described above. Such a system will provide an additional service for DIRECTV® users who require mobility.

Referring again to FIG. 1, in one or more embodiments of the invention discrete component technology would have to be designed into the actual host equipment such as the computer laptop 66 or PDA device 70. For example, antenna 62 may be required to be integrated into receiver equipment 18. Such requirements restrict the flexibility and potentially limit the technology to only one or two host manufacturers.

In view of these problems with integrated equipment, embodiments of the invention provide a solution in the form of a PC-like plug-in card that can be produced and/or plugged into a wide variety of manufacturers. Such embodiments may provide the ability for an interested buyer to purchase the card at an electronic store. Accordingly, a simple plug-in card solution provides the ability to work with many different manufacturers as opposed to integrating discrete technology into actual host equipment of each manufacturer. In this regard, multiple technologies are integrated into a single card thereby allowing greater flexibility amongst different user equipment.

The technologies integrated into the card may be derived from primarily commercial off the shelf (COTS) parts or software. However, some minor software may be required to support the integration of existing COST technology pieces in an effort to offer a plug-in card solution for a handheld device or laptop.

As described herein, a PC-like plug-in card may slide into equipment such as a computer laptop 66 or PDA device 70. The cards enable reception of proprietary television signals (as described above) for subscription programming to wireless users. Most PDAs 70 and computer laptops 66 provide PCMCIA (Personal Computer Memory Card International Association) and Flash card interfaces. Embodiments of the invention may be configured for accommodation by such interfaces. Accordingly, embodiments of the invention may be configured to interface with PCMCIA and other types of interfaces while other embodiments may interface with a Flash card or similar type of interface.

PCMCIA is an international standards body and trade association that has established a standard for connecting peripherals to portable computers. PCMCIA cards (also referred to as PC Cards) are credit-card sized, removable modules for portable computers that have been standardized by PCMCIA. PC Cards are traditionally 16-bit devices that are used to attach modems, network adapters, sound cards, radio transceivers, solid state disks and hard disks to a portable computer. Further, the PC Card is a "plug and play" device, which is configured automatically by card services software. PC Cards are often 85.6 mm long by 54 mm wide (3.37"×2.126") and use a 68-pin connector.

A Flash card is a small module that contains flash memory such as a PC Card, CompactFlash, SmartMedia or similar format.

Figure 14:
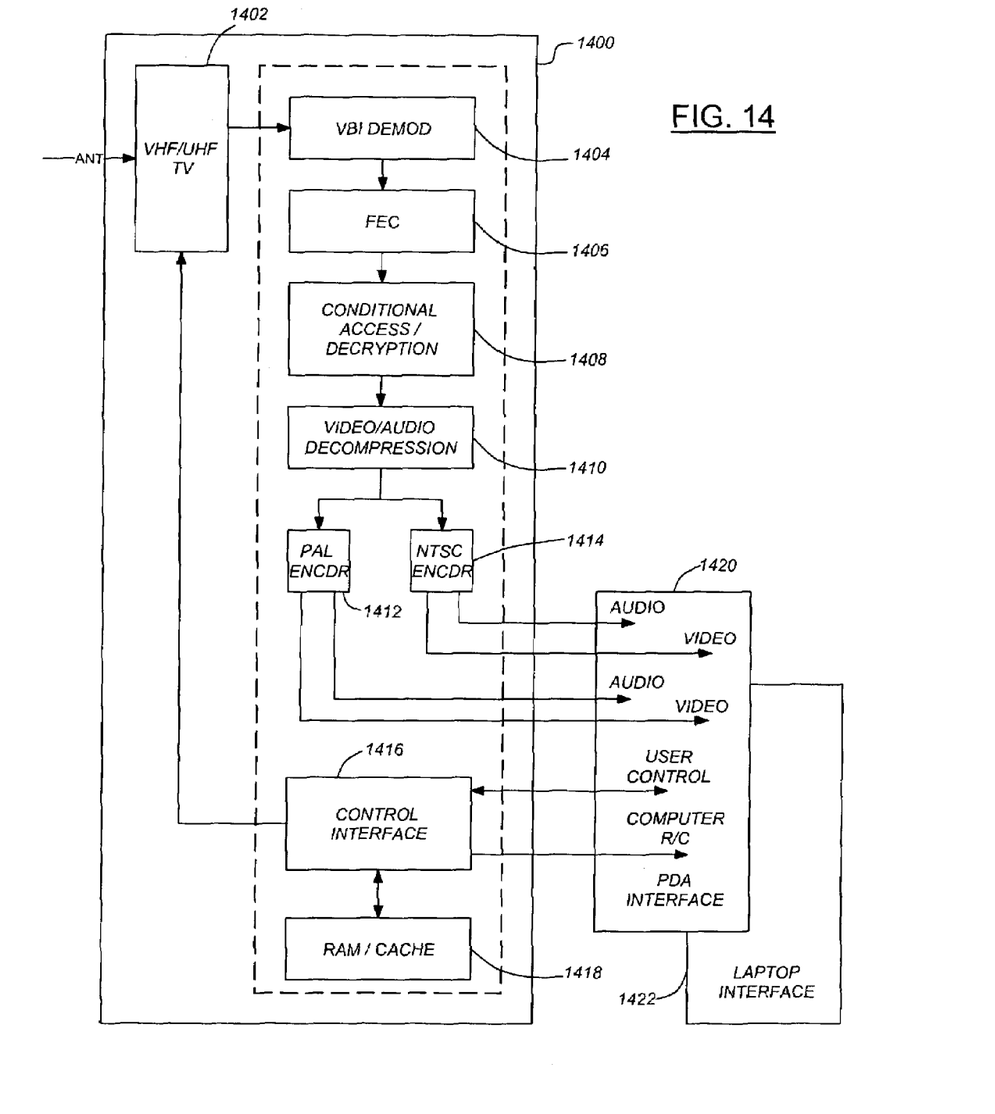
FIG. 14 illustrates a receiver card for use in accordance with one or more embodiments of the invention.

FIG. 14 illustrates a receiver/plug-in card for use in accordance with one or more embodiments of the invention. As described herein, the receiver card 1400 may be a single PCMCIA/PC or Flash card with integrated technologies. A micro UHF/VHF Television analog tuner/demodulator 1402 includes an antenna for receiving video programming and other digital information. The tuner/demodulator 1402 provides an output to the vertical blanking interval (VBI) device/demodulator 1404.

VBI demodulator 1404 provides VBI technology that separates the unused portion of the television signal to extract encoded proprietary television programming. The encoded proprietary programming is output to a forward error correction (FEC) unit 1406 that provides the capability to maintain a robust video broadcast stream while minimizing packet loss. The stream is passed from FEC unit 1406 to the conditional access/decryption unit 1408.

The conditional access decryption unit 1408 provides technology to control user access and support billing functions. For example, unit 1408 may provide the capability to restrict access to the stream to subscribing users. If access is to be granted, the stream is passed to video and audio decompression unit 1410 which contains the technology to decompress the video and audio data from the stream. The decompressed data is passed to a PAL (Phase Alternating Line) encoder 1412 and/or NTSC (National TV Standards Committee) encoder 1414. Both the PAL encoder 1412 and NTSC encoder 1414 process the stream to provide the desired television protocol for different regions in the world. In this regard, both encoders 1412 and 1414 may provide interlaced frames at different rates depending on the geographic area/region.

The audio and video data/frames from the encoders 1412 and 1414 are provided to the appropriate interface 1420-1422. If the card 1400 has been developed for the PDA 70, the audio and video data is provided to PDA interface 1420. Similarly, if the card 1400 has been developed for a laptop computer 66, the audio and video data is provided to laptop interface 1422.

In addition, a control interface 1416 within card 1400 may provide the ability to control television channel selection, volume, contrast, brightness, programming, menu selection, etc. The controller may also provide a computer interface to download pay-per-view (PPV) information via the Internet as a return link for billing and conditional access functions (i.e., through VHF/UHF tuner/demodulator 1402). The control interface 1416 may be communicatively coupled to random access memory(RAM)/cache 1418. System RAM/cache 1418 may be used to store selected PPV events for billing information and tracking as well as to store mini streams or user preferred functions.

In view of the above, the present invention advantageously uses the previously unused digitally vertical blanking interval of the digital satellite broadcast signal. Further, handheld devices are now capable of receiving over-the-air broadcasts of proprietary signals.

Conclusion

This concludes the description of the preferred embodiment of the invention. However, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for processing broadcast subscription video programming, comprising:
   receiving from a terrestrial over-the-air wireless broadcast, broadcast programming into a micro analog tuner of a plug-in card of a portable device;
   separating, within the plug-in card, a vertical blanking interval from the broadcast programming and extracting encoded proprietary programming carried in the vertical blanking interval wherein the extracted encoded proprietary programming comprises subscription cable-type motion television video programming;
   controlling, within the plug-in card, user access to the encoded proprietary programming using conditional access technology;
   decompressing, within the plug-in card, video and audio data from the encoded proprietary programming using decompression technology;
   encoding, within the plug-in card, the video and audio data to provide the video and audio data in a desired protocol;
   controlling, within the plug-in card, video programming properties; and
   storing video programming information in memory on the plug-in card.

2. The method of claim 1, wherein the micro analog tuner comprises an antenna.

3. The method of claim 1, wherein the audio and video data are encoded using a PAL encoder.

4. The method of claim 1, wherein the audio and video data are encoded using an NTSC encoder.

5. The method of claim 1, wherein the video programming properties are selected from a group comprising channel selection, volume, contrast, brightness, programming, and menu selection.

6. The method of claim 1, further comprising providing a computer interface to download pay-per-view (PPV) information via Internet as a return link for billing and conditional access functions.

7. The method of claim 1, wherein the memory comprises RAM.

8. The method of claim 1, wherein the memory is used to store selected pay-per-view events for billing information and tracking.

9. The method of claim 1, wherein the memory is used to store mini streams or user preferred functions.

10. The method of claim 1, further comprising providing the encoded video and audio data to a personal digital assistant interface.

11. The method of claim 1, further comprising providing the encoded video and audio data to a computer laptop interface.

12. The method of claim 1, further comprising maintaining a robust video broadcast stream minimizing packet loss using a forward error correction unit on the plug-in chip.

13. An integrated plug-in card for processing broadcast subscription video programming comprising:
    a micro analog tuner of a portable device for receiving the broadcast programming via terrestrial over-the-air wireless broadcast and providing output to a vertical blanking interval (VBI) device;
    the vertical blanking interface device configured to separate a vertical blanking interval carried in the broadcast subscription video programming and extracting an encoded proprietary programming from the vertical blanking interval wherein the extracted encoded proprietary programming comprises subscription cable-type television motion video programming;
    conditional access technology configured to control user access to the encoded proprietary programming;
    video and audio decompression technology configured to decompress video and audio data from the encoded proprietary programming;
    an encoder configured to provide the video and audio data in a desired protocol;
    a control interface configured to control video programming properties;
    memory for storing video programming information.

14. The plug-in card of claim 13, wherein the micro analog tuner comprises an antenna.

15. The plug-in card of claim 13, wherein the encoder comprises a PAL encoder.

16. The plug-in card of claim 13, wherein the encoder comprises an NTSC encoder.

17. The plug-in card of claim 13, wherein the video programming properties are selected from a group comprising channel selection, volume, contrast, brightness, programming, and menu selection.

18. The plug-in card of claim 13, further comprising a computer interface to download pay-per-view (PPV) information via Internet as a return link for billing and conditional access functions.

19. The plug-in card of claim 13, wherein the memory comprises RAM.

20. The plug-in card of claim 13, wherein the memory is used to store selected pay-per-view events for billing information and tracking.

21. The plug-in card of claim 13, wherein the memory is used to store mini streams or user preferred functions.

22. The plug-in card of claim 13, further comprising an interface for a personal digital assistant.

23. The plug-in card of claim 13, further comprising an interface for a computer laptop.

24. The plug-in card of claim 13, further comprising forward error correction capability configured to maintain a robust video broadcast stream minimizing packet loss.

* * * * *

UNITED STATES PATENT AND TRADEMARK OFFICE
CERTIFICATE OF CORRECTION

PATENT NO. : 7,584,493 B2
APPLICATION NO. : 10/409875
DATED : September 1, 2009
INVENTOR(S) : Sibley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this

Fourteenth Day of September, 2010

David J. Kappos
*Director of the United States Patent and Trademark Office*